United States Patent [19]

Parish

[11] Patent Number: 5,222,753
[45] Date of Patent: Jun. 29, 1993

[54] ATV TRAILER APPARATUS

[76] Inventor: Glen D. Parish, 125 Falcon Ridge Dr., Raymond, Miss. 39154

[21] Appl. No.: 783,391

[22] Filed: Oct. 28, 1991

[51] Int. Cl.⁵ .......................................... B62D 47/00
[52] U.S. Cl. .................................... 280/400; 211/64; 211/70.8; 224/275; 297/391
[58] Field of Search ............ 280/400, 424, 204, 304.5, 280/32.7, 63, 769; 296/182, 63, 64; 24/275, 281, 324, 325, 328, 329, 331, 42.33, 42.39, 42.4, 913, 922; 211/64, 70.8, 71, 72, 89, 128, 135; 297/61, 391, 394, 396

[56] References Cited

U.S. PATENT DOCUMENTS

| | | | |
|---|---|---|---|
| 2,645,392 | 7/1953 | Gottsegen | 224/275 |
| 2,797,033 | 6/1957 | Rasbach | 211/64 |
| 2,855,108 | 10/1958 | Haapala | 211/64 |
| 3,141,681 | 7/1964 | Cedarstrand | 280/63 |
| 3,167,182 | 1/1965 | Calvin | 211/64 |
| 3,174,574 | 3/1965 | Mason | 280/400 |
| 3,480,320 | 11/1969 | Turner et al. | 280/400 |
| 3,515,434 | 6/1970 | Sugiura et al. | 297/396 |
| 3,586,366 | 6/1971 | Patrick | 297/391 |
| 4,045,103 | 8/1977 | Paolino | 211/71 |
| 4,792,149 | 12/1988 | Harmon | 280/231 |
| 4,986,427 | 1/1991 | Law et al. | 211/70.8 |

FOREIGN PATENT DOCUMENTS 0053551 9/1932 Norway .................. 280/204

Primary Examiner—Margaret A. Focarino
Assistant Examiner—Anne Marie Boehler
Attorney, Agent, or Firm—Hugh E. Smith

[57] ABSTRACT

A trailer includes a support platform with a forwardly projecting trailer tongue for mounting the trailer to an associated self-propelled vehicle. The trailer structure includes a seat member mounted to a seat platform spaced above the floor platform, with the seat platform including a divider wall, and wherein the divider wall is arranged for the selective mounting of a carrier member thereon.

2 Claims, 4 Drawing Sheets

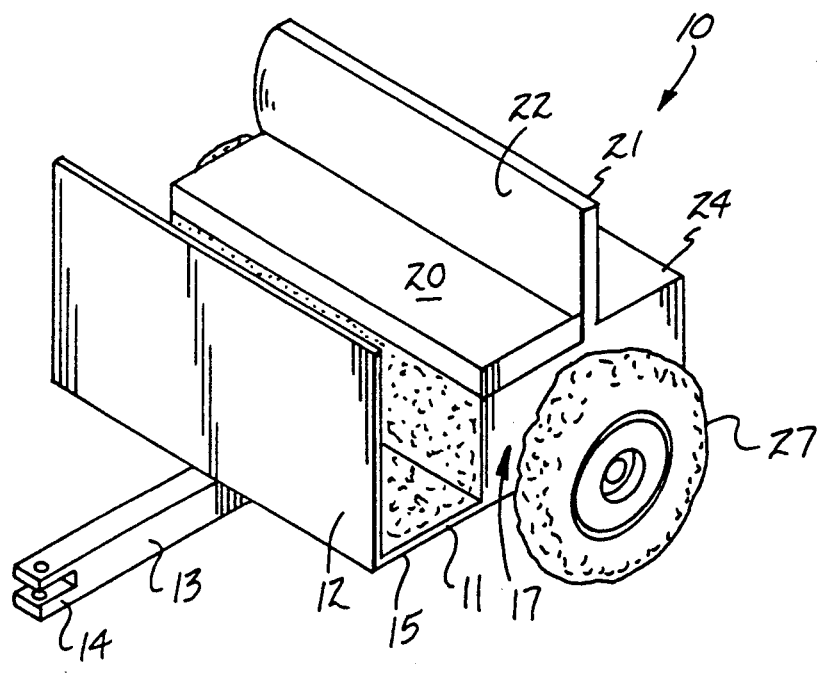
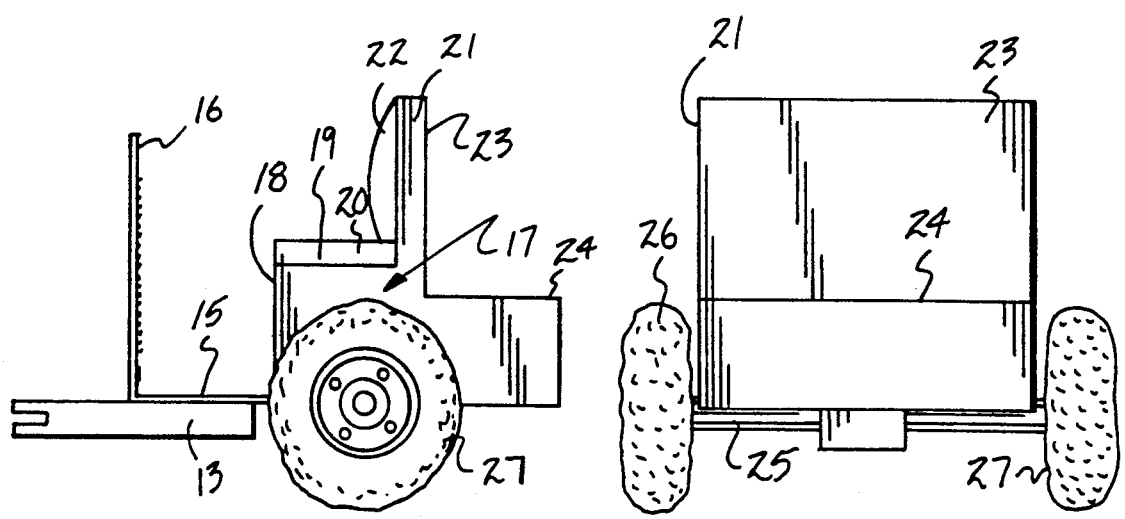

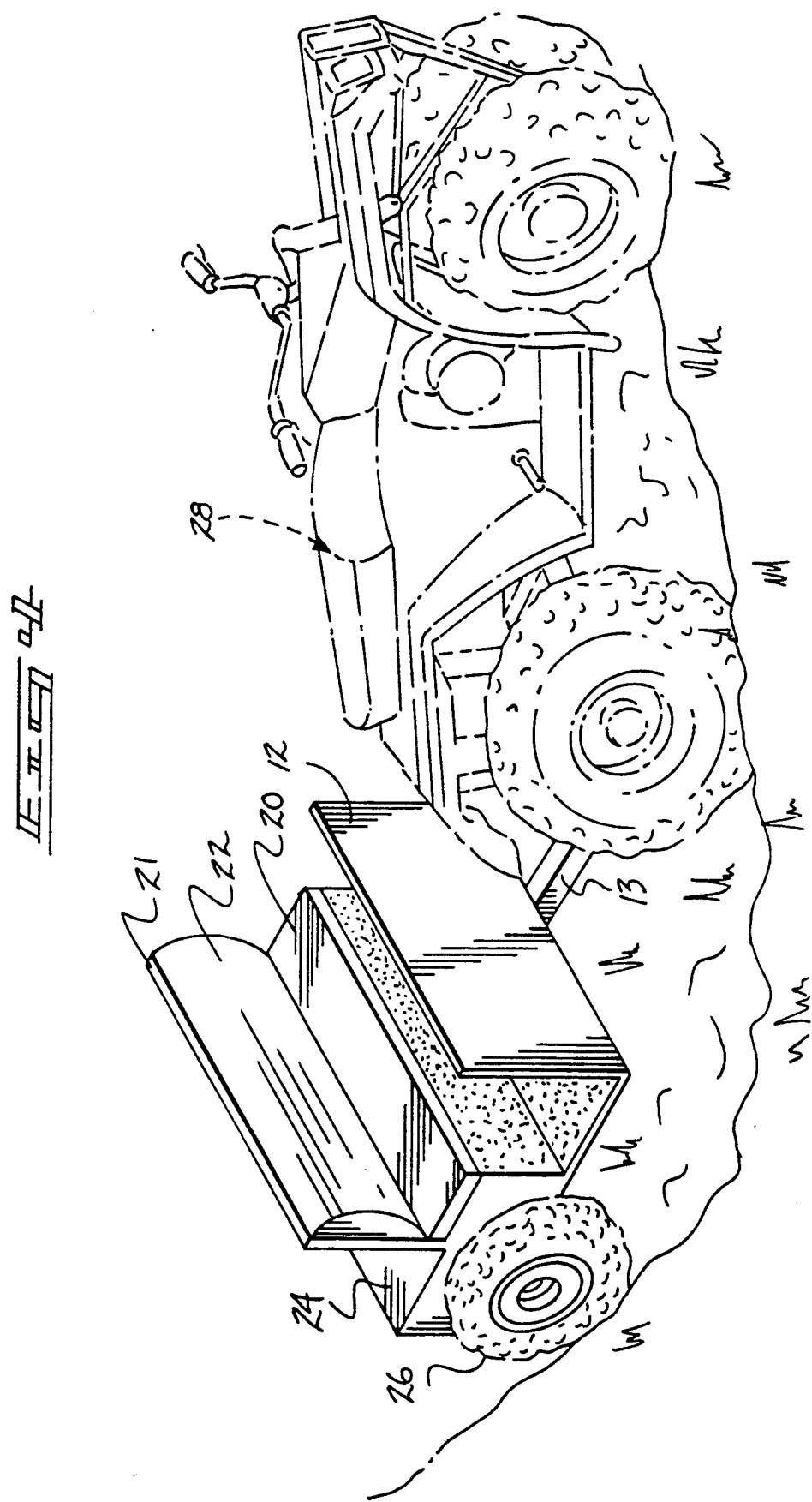

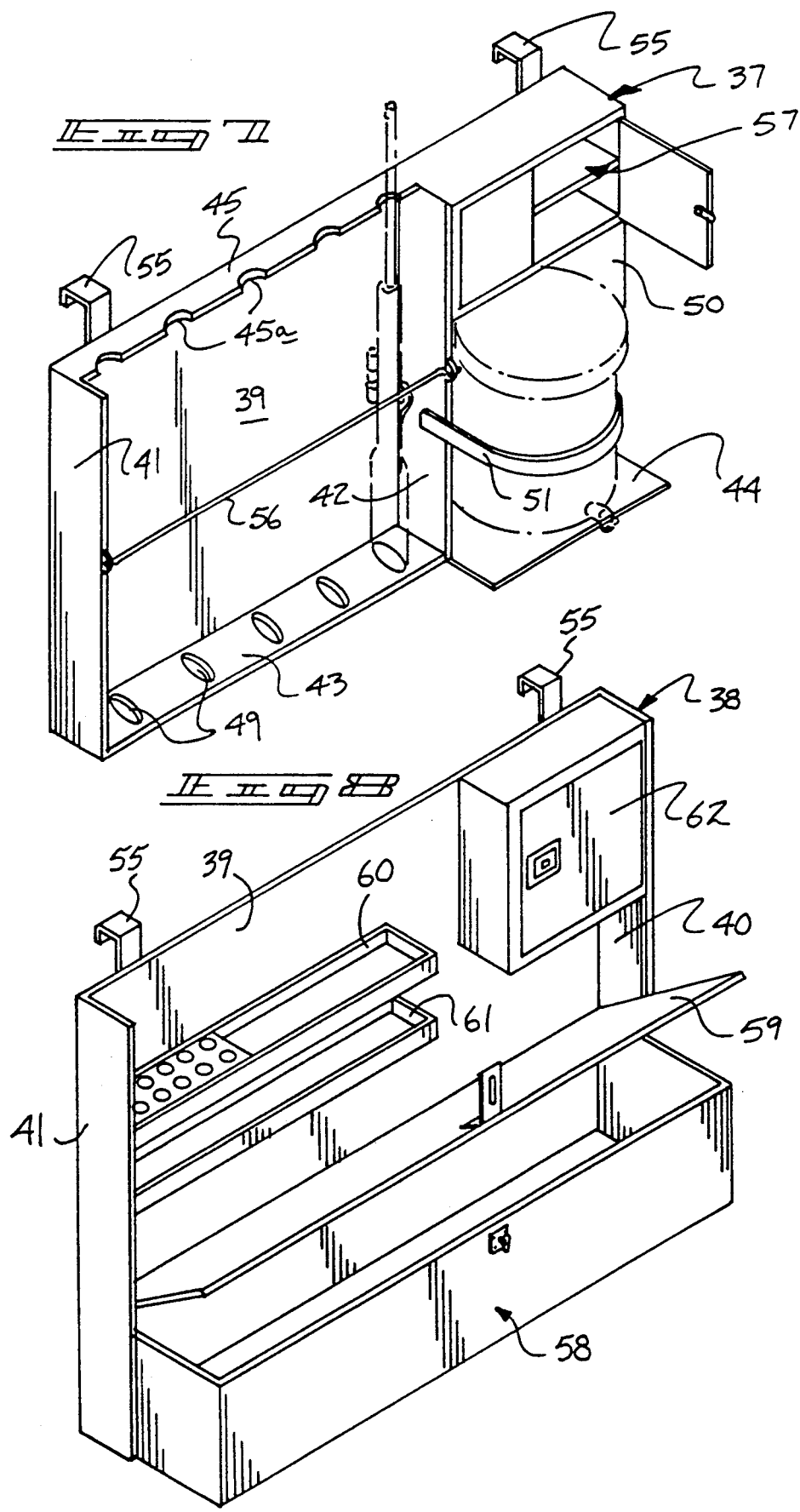

ATV TRAILER APPARATUS

BACKGROUND OF THE INVENTION

1. Field of the Invention

The field of invention relates to trailer apparatus, and more particularly pertains to a new and improved ATV trailer apparatus wherein the same is arranged for ease of mounting and transport of the trailer relative to a self-propelled ATV vehicle.

2. Description of the Prior Art

Apparatus of various types are arranged for mounting to an associated vehicle to provide for specialized interrelationship therebetween. The instant invention attempts to provide for an improved trailer apparatus arranged for particular mounting to an ATV vehicle to accommodate transport of various components by the trailer structure.

Prior art trailer apparatus is exemplified in U.S. Pat. No. 4,928,985 to Nowlin wherein a bicycle includes a buggy structure arranged for securement to the bicycle.

U.S. Pat. No. 4,638,970 to Smith provides for a trailer for securement to an all-terrain vehicle (ATV) to include a universal swiveling structure coupling of the trailer relative to the vehicle.

U.S. Pat. No. 4,752,177 to Zenna sets forth a motorcycle trailer apparatus, and U.S. Pat. No. 4,119,331 to Jackson sets forth a collapsible golf cart apparatus for specialized use relative to tow vehicles.

Accordingly, it may be appreciated that there continues to be a need for a new and improved ATV trailer apparatus as set forth in the instant invention which addresses both the problems of ease of use as well as effectiveness in construction and in this respect, the present invention substantially fulfills this need.

SUMMARY OF THE INVENTION

In view of the foregoing disadvantages inherent in the known types of trailer apparatus now present in the prior art, the present invention provides an ATV trailer apparatus wherein the same is arranged for ease of mounting and securement to a self-propelled all-terrain vehicle (ATV). As such, the general purpose of the present invention, which will be described subsequently in greater detail, is to provide a new and improved ATV trailer apparatus which has all the advantages of the prior art trailer apparatus and none of the disadvantages.

To attain this, the present invention provides a trailer including a support platform with a forwardly projecting trailer tongue for mounting the trailer to an associated self-propelled vehicle. The trailer structure includes a seat member mounted to a seat platform spaced above the floor platform, with the seat platform including a divider wall, and wherein the divider wall is arranged for the selective mounting of a carrier member thereon.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved ATV trailer apparatus which has all the advantages of the prior art trailer apparatus and none of the disadvantages.

It is another object of the present invention to provide a new and improved ATV trailer apparatus which may be easily and efficiently and marketed.

It is a further object of the present invention to provide a new and improved ATV trailer apparatus which is of a durable and reliable construction.

An even further object of the present invention is to provide a new and improved ATV trailer apparatus which is susceptible of a low cost of manufacture with regard to both materials and labor, and which accordingly is then susceptible of low prices of sale to the consuming public, thereby making such ATV trailer apparatus economically available to the buying public.

Still yet another object of the present invention is to provide a new and improved ATV trailer apparatus which provides in the apparatuses and method of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic side view of the instant invention.

FIG. 3 is a orthographic rear view of the instant invention.

FIG. 4 is an isometric illustration of the invention in use.

FIGS. 6, 7, and 8 illustrate the use of respective first, second, and third carrier members for securement to the divider wall.

DESCRIPTION OF THE PREFERRED EMBODIMENT

Figure 5:
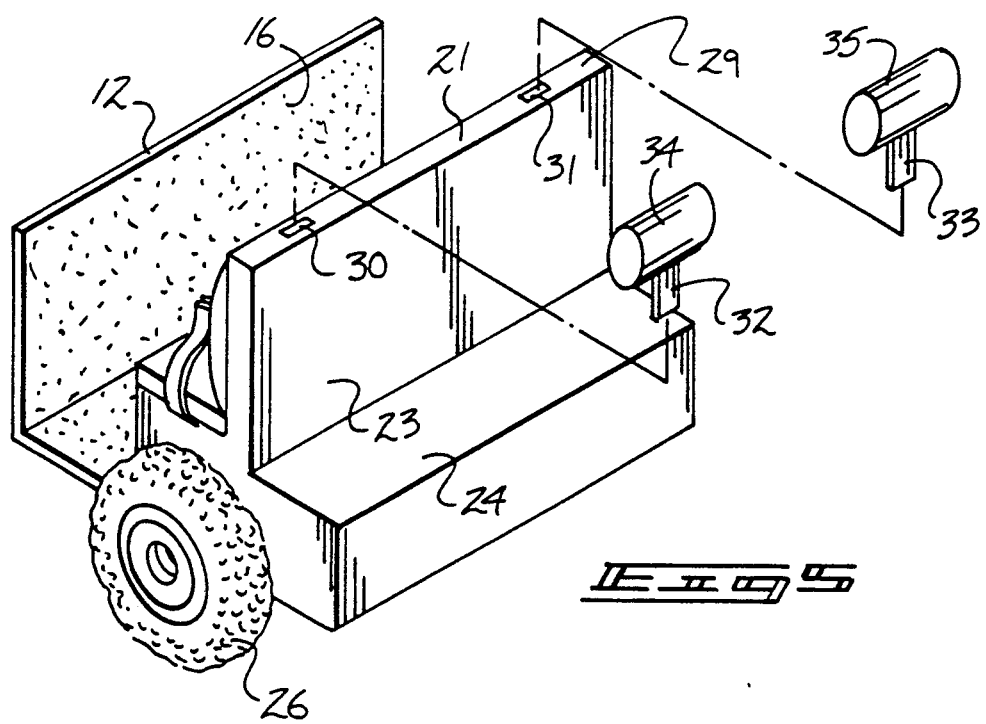
FIG. 5 is an isometric illustration of the trailer structure utilizing head rest members removably mounted relative to a divider wall.

With reference to the drawings, and in particular to FIGS. 1 to 8 thereof, a new and improved ATV trailer apparatus embodying the principles and concepts of the present invention and generally designated by the reference numerals 10 will be described.

More specifically, the ATV trailer apparatus 10 of the instant invention essentially comprises a base platform 11 and a front wall 12 integrally and orthogonally mounted to a forward edge of the base platform extending upwardly thereof, with a trailer tongue 13 extending orthogonally and medially forwardly of the front wall 12, wherein the trailer tongue 13 terminates in a bifurcated forward distal end 14 for securement to an associated ATV vehicle 28, of the type as illustrated in FIG. 4. The platform 11 includes a platform floor 15 extending between a front wall rear surface 16 and a seat platform 18 that is in confronting and spaced relationship relative to the front wall rear surface 16. The seat platform front wall 18 is arranged as a portion of a seat platform 17 extending upwardly relative to the base platform 11. The seat platform front wall 18, the platform floor 15, and the front wall rear surface 16 are each coextensively covered with a fibrous covering for comfort of individuals positioned upon the seat platform 17. A seat platform first top wall 19 mounted orthogonally to an upper edge of the seat platform wall 18 is arranged in a parallel spaced relationship relative to the base platform 11 and includes a first seat cushion 20 mounted coextensively thereover. A seat platform divider wall 21 extends upward and orthogonally relative to the seat platform first top wall 19 and includes a second seat cushion 22 mounted to a front surface of the seat platform divider wall 21. A seat platform rear surface 23 is arranged parallel to and in a spaced relationship relative to the seat platform seat cushion front surface 22 as the seat platform rear surface 23 extends below the divider wall front surface of the divider wall 21. A seat platform second top wall 24 is arranged parallel to and spaced below the platform first top wall 19 for transport of various cargo components thereon. An axle 25 fixedly mounted to a bottom surface of the base platform 11 below the seat platform first top wall 19 and in medial alignment therewith includes a respective right and left wheel 26 and 27 mounted to each distal end of the axle as each wheel is rotatably mounted thereto for ease of towing of the trailer structure in use.

The divider wall 21 includes a divider wall top surface 29, as illustrated in the FIG. 5, to include respective spaced first and second well 30 and 31 to receive a respective first and second head rest support plate 32 and 33 of a respective first and second head rest cushion 34 and 35 orthogonally mounted to an upper distal end of said support plate.

Figure 6:
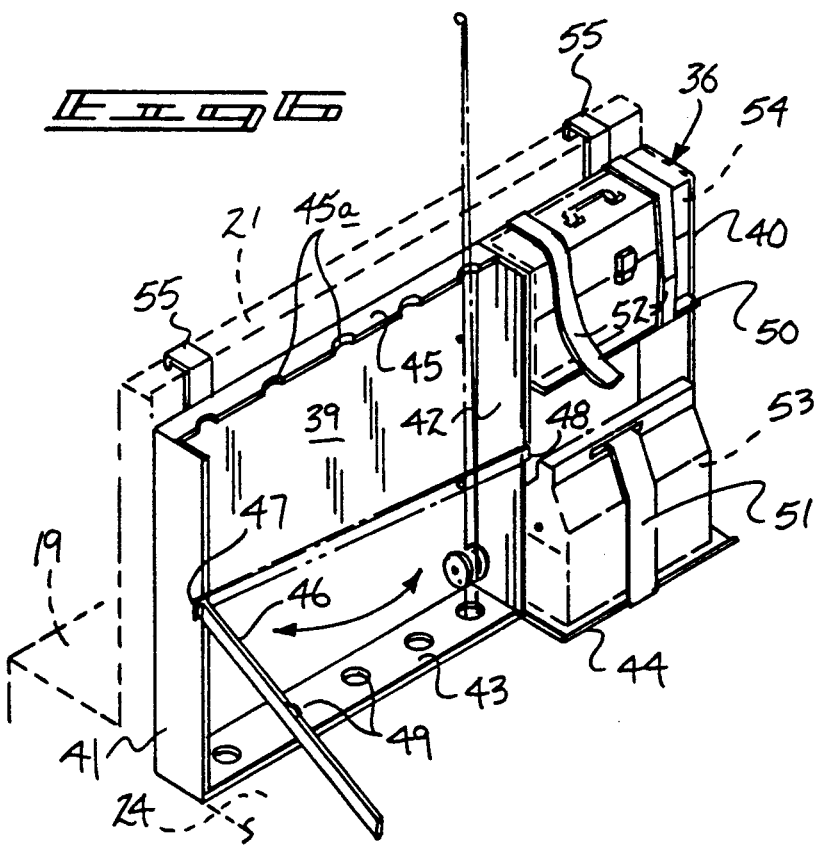

The FIGS. 6-8 illustrate the use of respective first, second, and third carrier members 36, 37, and 38 respectively for ease of transport of various components in association with the trailer apparatus.

Specifically, the first carrier member 36 is arranged to include a support wall 39 formed with a first side wall 40 spaced from and parallel a second-side wall 41 integrally mounted and orthogonally oriented relative to opposed side edges of the support wall 39, with a medial wall 42 arranged parallel and coextensive with the first and second side wall orthogonally mounted to the forward surface of the support wall 39. A first floor 43 extending orthogonally between the lower edge portions of the first side wall 40 and the medial wall 42 is arranged parallel to and spaced below a coextensive top wall 45 that is formed with spaced semi-cylindrical recesses directed into the top wall from a forward edge thereof. A second floor 44 positioned between the medial wall 42 and the second side wall 41 is arranged for positioning and mounting of a first container 53 thereon by a first band 51 formed of either elastomeric material or alternatively utilizing various fastening connections to mount the first container 53 to the second floor 44.

A lock bar 46 includes a lock bar hinge 47 mounted medially to a forward edge of the second side wall 41 and is securable to the medial wall 42 by the use of a latch 48. The first floor 43 includes a plurality of spaced cavities 49 that are coaxially aligned with a respective semi-cylindrical recess 45a to permit positioning of various fishing rods, as illustrated in the FIG. 6, or alternatively of rifle members, such as illustrated in the FIG. 7. Medial floor 50 integrally mounted between the medial wall 42 and the first side wall 40 is spaced above and parallel the second floor 44 and may include a single or plurality of second bands 52 also formed of selective elastomeric or convenient fastening structures such as hook and loop fastening structures as may be available in the prior art. Spaced hook members 55 projecting above and fixedly mounted to and adjacent the upper edge of the support plate 39 each define a "U" shaped cavity to receive the divider wall 21 to permit ease of mounting of the first carrier member 36 thereto. It should be noted that the platform rear surface 23 is defined by a predetermined height and is substantially equal to a predetermined height defined between each respective spaced hook member 55 and the first floor 43.

The second carrier member 37 is constructed in similarity to the first carrier member 36, but is arranged to include an elastomeric strap 56 extending between the first side wall 41 and the medial wall 42 and includes a chest container 57 to contain drinking fluid thereon secured by an associated first band 51. A container 57 is positioned above the second floor 44 between the remedial wall and the first side wall 40 for convenience of various components.

The third carrier members 38 includes a tool chest 58 extending coextensively between the first side wall 41 and a second side wall 40, as illustrated, between a first and second support tray 60 and 61 respectively mounted to the support wall 39 and the second wall 41 in cooperation with the support chest 62 positioned in communication with the first side wall 40 and the support wall 39, with the understanding that the carrier members 36, 37, and 38 are utilized in selective relationship relative to the trailer structure.

As to the manner of usage and operation of the instant invention, the same should be apparent from the above disclosure, and accordingly, no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An ATV trailer apparatus, comprising:
   a base platform, the base platform including a forward edge and a front wall integrally mounted to the forward edge in an orthogonal relationship relative to the base platform, and
   the base platform including a trailer tongue fixedly mounted to the base platform extending forwardly thereof medially of the front wall, with the trailer tongue orthogonally oriented relative to the front wall, and
   the base platform including a seat platform extending upwardly of the base platform integrally mounted thereto, wherein the seat platform includes a seat platform front wall spaced from and parallel the base platform front wall, and
   a platform floor orthogonally oriented between the base platform front wall and the seat platform front wall, and the seat platform further including a seat platform first top wall integrally and orthogonally mounted to an upper distal end of the seat platform front wall, with a first seat cushion mounted coextensively to the seat platform first top wall, and a seat platform second top wall parallel to, positioned rearwardly of, and below the seat platform first top wall, and a seat platform divider wall orthogonally oriented between the seat platform first top wall and the seat platform second top wall, and
   a second seat cushion mounted to a front surface of the divider wall, with the second seat cushion orthogonally oriented to the first seat cushion and in confrontation to the base platform front wall, and
   the divider wall includes a divider wall top surface, and the divider wall top surface includes a respective first and second well extending into the divider wall from the divider wall top surface, and a respective first and second head rest support plate including a respective first and second head rest cushion mounted to the respective first and second head rest support plates, with the first and second head rest support plates received within the respective first and second well, and
   an axle fixedly mounted to a bottom surface of the base platform positioned medially below the seat platform first top wall, and the axle extending laterally of the base platform and including a respective right and left wheel rotatably mounted to a respective right and left distal end of the axle adjacent the base platform, and
   at least one carrier member, the at least one carrier member including a support wall, the support wall including a support wall front wall surface and a support wall rear surface, the support wall rear surface including a plurality of spaced hook members integrally mounted to the support wall front surface extending upwardly thereof, and the at least one carrier member arranged for securement to the divider wall, and the divider wall rear surface defined by a predetermined height, and the carrier member is defined by said predetermined height extending from the hook members to a lowermost terminal edge of the support wall, and the support wall including a first side wall spaced from and parallel a second side wall orthogonally and integrally mounted to opposed first and second side edges of the support wall, and a medial wall arranged parallel to and coextensively between the first side wall and the second side wall, and a first floor extending between a lower distal end of the second side wall and a lower distal end of the medial wall, and a top wall integrally mounted to an upper distal end of the second side wall and the medial wall, and the top wall including a plurality of spaced semi-cylindrical recesses directed into the top wall from a top wall free edge spaced from the support wall, and the first floor including a plurality of spaced recesses, each of said recesses is coaxially aligned with at least one of said semi-cylindrical recesses of the top wall for positioning of an elongate workpiece between at least one of said spaced recesses and within one of said semi-cylindrical recesses, and a lock bar, the lock bar including a hinge pivotally mounting a first distal end of the lock bar to the second side wall, and a latch member mounted to a second distal end of the lock bar for securement of the second distal end of the lock bar to the medial wall.

2. An apparatus as set forth in claim 1 including a second floor coplanar with the first floor positioned between the medial wall and the first side wall, and a medial floor positioned between the medial wall and the first side wall spaced above and parallel the second floor, and a first container mounted upon the first floor, and a second container mounted upon the medial floor, and at least a first band mounted to the second floor for securement of the first container thereto, and at least one further band mounted to the medial wall for securement of the second container thereto.

* * * * *